United States Patent Office 3,413,350
Patented Nov. 26, 1968

3,413,350
PURIFICATION OF AROMATIC DIAMINES
James M. Cross, New Martinsville, Clyde D. Campbell, Wheeling, and Sidney H. Metzger, Jr., New Martinsville, W. Va., assignors to Mobay Chemical Company, Pittsburgh, Pa., a corporation of Delaware
No Drawing. Filed Mar. 9, 1965, Ser. No. 438,390
7 Claims. (Cl. 260—582)

ABSTRACT OF THE DISCLOSURE

Reaction of o-aromatic diamines with carbon dioxide to produce benzimidazolinones. Removal of o-aromatic diamines from diamine mixtures by selective reaction of the o-aromatic diamines with carbon dioxide.

---

This invention relates to an improved process for the preparation of aromatic diamines and more particularly, to a process for preparing aromatic diamines free of o-diamines.

Aromatic diamines have found wide-spread use as an intermediate in the production of organic isocyanates. Aromatic diamines are generally prepared by nitrating the nucleus whether it be benzene, toluene, naphthylene or the like and subsequently hydrogenating the nitro groups to form the corresponding amines. The reaction conditions for both the nitration and the hydrogenation are so chosen that a minimum amount of o-diamine is produced. The o-diamines are disadvantageous when present in the phosgenation step to convert the diamines to the corresponding isocyanates because the o-isomers are not converted to the isocyanates, but form tarry residues that react with the desired isomers resulting in a loss of the desirable reactants and in the ultimate yield of the isocyanate. In the nitration and hydrogenation steps, the formation of o-diamines has not been completely eliminated, and they still form in amounts up to about 4 percent.

In the commercial preparation of isocyanates, no suitable method has been derived for removing the diamines and thus, the residue remaining in the still after producing the aromatic isocyanates is present in large quantities which have not found any advantageous use. These black tarry residues are difficult to discard and have in some instances created small black mountainous ranges on real-estate owned by isocyanate producers.

It has been heretofore known in U.S. Patent 3,134,813 to react a crude mixture of toluylene diamine containing about 4% of the o-diamines with carbon bisulfide at a temperature of from about 25° C. to about 75° C. to convert the o-diamines to cyclic thioureas which remain in the residue upon distilling off the desired 2,4- and 2,6-toluylene diamines. While this method effectively removes the o-toluylene diamines, the use of carbon bisulfide is hazardous because it is a poisonous, toxic, highly reactive, flammable material.

It is therefore an object of this invention to provide an improved method of removing o-aromatic diamines from a mixture of aromatic diamines. It is another object of this invention to provide a method for selectively removing o-aromatic diamines from a mixture of aromatic diamines. It is still another object of this invention to provide an improved method of removing o-toluylene diamines from a mixture of isomers of toluylene diamine. It is another object of this invention to provide a method of producing methyl benzimidazolinones.

The foregoing objects and others which will become apparent from the following description are accomplished in accordance with the invention generally speaking by reacting o-aromatic diamines with carbon dioxide at an elevated temperature. This reaction occurs substantially selectively with o-diamines to the exclusion of other aromatic diamines present.

In the practice of the process in accordance with this invention, the o-diamines or mixture of o-diamines with other aromatic diamines are mixed with carbon dioxide at an elevated temperature and preferably at least 200° C. The upper temperature limit is determined only by the decomposition point of the reactants present. The process can be operated at atmospheric pressure, but it is preferred that super atmospheric pressures be used. If the process is operated at atmospheric pressure, it is preferred that the carbon dioxide is introduced into the aromatic diamine in the gaseous state and that the bubbles are maintained therein as long as possible by maintaining the mean free path of the bubbles very small. This can be accomplished by mechanical means such as rapid agitation, a plurality of baffles and other techniques, known for maintaining a gas within a liquid for long periods of time. As stated above, it is preferred that the process be conducted under pressure. A pressure of at least 400 p.s.i.g. is preferred.

The process in accordance with this invention is applicable wherever o-aromatic diamines are present in either small quantities or in quantities up to and including 100% o-aromatic diamines. For example, if it is desired to produce 5-methylbenzimidazolinones, 3,4-toluylene diamine is reacted with carbon dioxide under the conditions specified. Such compounds are useful as intermediates in the preparation of polymers, products having physiological activity, dyestuffs and herbicides.

The invention is specifically applicable to the separation of o-aromatic diamines from a mixture of isomers wherein the diamine is to be ultimately used in the preparation of corresponding isocyanates by phosgenation. Any mixture of aromatic diamines can be treated in accordance with this invention to selectively remove the o-diamines such as, for example, phenylene diamines, toluylene diamines, chlorophenylene diamines, methoxyphenylene diamines, ethyl phenylene diamines, naphthylene diamines, diphenyl diamines, diphenylmethane diamines and the like. Because of the commercial importance of toluylene diisocyanates, the invention is particularly applicable to the separation of o-toluylene diamines from an isomeric mixture containing primary 2,4- and 2,6-toluylene diamine. As stated previously, the operating conditions used in the preparation of the isomeric mixture of toluylene diamines are maintained to keep the formation of the o-toluene diamines at a minimum. However, amounts in the range of from 3 to 4% generally are present after the hydrogenation of dinitrotoluene.

The invention is further illustrated but not limited by the following examples in which parts are by weight unless otherwise specified.

EXAMPLE 1

About 490 parts of an isomeric mixture of toluylene diamine having from about 3.8 to 3.9 percent of o-toluene diamines are charged into a stainless steel stirred autoclave. This autoclave is purged 8 times with carbon dioxide to remove substantially all traces of air. The autoclave is then pressurized with carbon dioxide and heated with stirring to about 240° C. for about 6 hours. The pressure in the autoclave during this time is from about 1800 to about 2000 p.s.i.g. and no control over the pressure is maintained.

About 490 parts of material are removed from the autoclave and distilled in vacuum at about 1.7 mm. Hg at a temperature of from about 125–170° C. About 430.7 parts of toluylene diamines substantially free of o-diamines are recovered in the distillation. The residue from the distillation is slurried with methanol and filtered.

About 17 parts of solid are removed and this solid is identified by infra-red spectra data as being methyl benzimidazolinones. The methanol filtrate is distilled to remove the methanol and about 24 parts of toluylene diamines free of o-diamines are recovered. The total toluylene diamine free of o-toluylene diamine recovered is therefore 454.7 parts.

EXAMPLE 2

About 1487 parts of an isomeric mixture of toluylene diamines, having from 3.8 to 3.9% of o-toluylene diamines are charged to a glass flask equipped with a turbine-type stirrer, gas inlet tube, thermometer and a long condenser open to the atmosphere. This mixture is heated to about 275–280° C. with a mild stream of $CO_2$ passing through the mixture. During the heating period, a constant and continuous stream of $CO_2$ is maintained through the reaction mixture. At the end of about 24 hours heating, under the above conditions, the reaction mixture is found to be substantially free of o-diamines. The reaction mixture is distilled and treated in the same manner as described in Example 1, giving a total yield of 1370 gms. of toluylene diamine substantially free of o-diamines.

It is of course to be understood that any o-aromatic diamine can be reacted with $CO_2$ in accordance with these examples set forth herein and that the examples present the best mode known for practicing the invention and should not be construed as a limitation. Any of the aromatic diamines set forth can be purified by separation of the o-diamine components by using such mixtures in the process of these examples.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A process for removing o-aromatic diamine from a mixture of aromatic diamines which comprises reacting an excess of carbon dioxide with said mixture of aromatic diamines at a temperature of at least about 200° C. and separating the unreacted aromatic diamine.

2. The process of claim 1 wherein the aromatic diamines are selected from the group consisting of phenylene diamines, toluylene diamines, chlorophenylene diamines, methoxyphenylene diamines, ethylphenylene diamines, napththylene diamines, diphenylene diamines and diphenylmethane diamines.

3. A process for removing o-toluylene diamine from an isomeric mixture of toluylene diamines which comprises reacting an excess of carbon dioxide with said mixture of toluylene diamines at a temperature of at least about 200° C. and separating the unreacted toluylene diamines.

4. The process of claim 3 wherein the reaction is conducted under super atmospheric pressure.

5. The process of claim 3 wherein the pressure is at least 400 p.s.i.g.

6. A process for removing o-toluylene diamines from an isomeric mixture of toluylene diamines which comprises reacting said isomeric mixture with carbon dioxide at a temperature of at least about 200° C., distilling the reaction mixture to remove an isomeric mixture substantially free of o-diamines, slurrying the residue in an inert liquid, filtering said slurry and distilling off the inert liquid from the filtrate.

7. A process for removing o-toluylene diamines from an isomeric mixture of toluylene diamines which comprises reacting said isomeric mixture with carbon dioxide at a temperature of at least about 200° C. and then distilling the reaction mixture to remove an isomeric mixture substantially free of o-diamines.

References Cited

UNITED STATES PATENTS

| 2,535,006 | 12/1950 | Woodward | 260—309.6 |
| 2,606,187 | 8/1952 | Hoffman | 260—309.2 |
| 2,642,396 | 6/1953 | Roddy | 260/309.2 |
| 3,128,310 | 4/1964 | Koch | 260—582 |
| 3,134,813 | 5/1964 | Pelly | 260—582 |
| 3,235,559 | 2/1966 | Blöcher et al. | 260—309.2 |
| 3,246,035 | 4/1966 | Forman | 260—578 |

FOREIGN PATENTS 811,692  4/1959  Great Britain.

HENRY R. JILES, *Primary Examiner.*

N. TROUSOF, *Assistant Examiner.*